J. A. STEINMETZ.
VALVE.
APPLICATION FILED APR. 5, 1918.
1,275,783.
Patented Aug. 13, 1918.
FIG. 1.
FIG. 2.
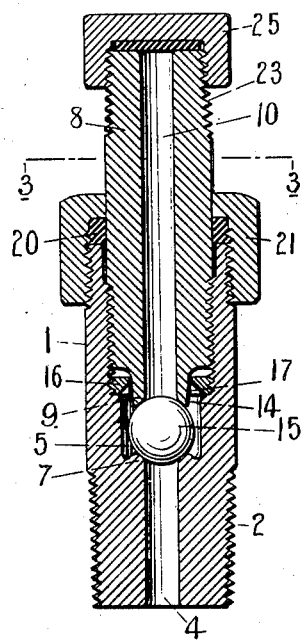
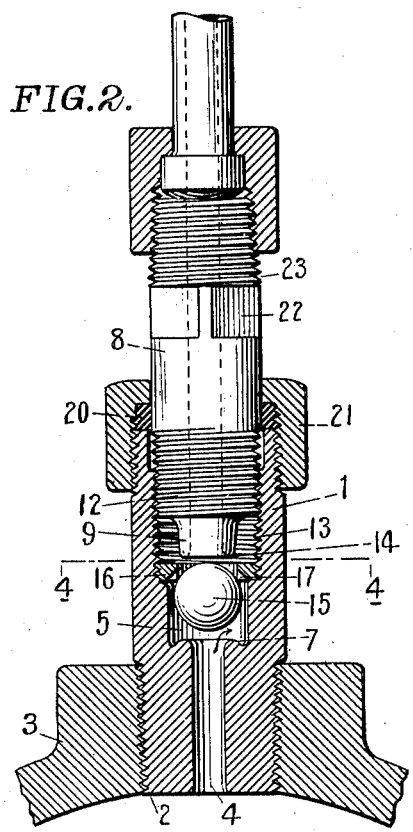
FIG. 3.
FIG. 4.
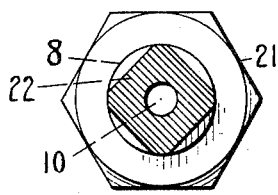
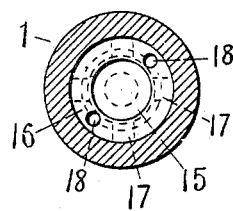
FIG. 5.
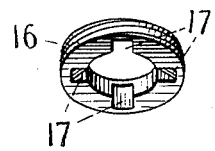
Inventor
Joseph A. Steinmetz
By H. DeWitt Goodwin
Attorney

UNITED STATES PATENT OFFICE.

JOSEPH A. STEINMETZ, OF PHILADELPHIA, PENNSYLVANIA.

VALVE.

1,275,783.

Specification of Letters Patent.

Patented Aug. 13, 1918.

Application filed April 5, 1918. Serial No. 226,966.

*To all whom it may concern:*

Be it known that I, JOSEPH A. STEINMETZ, a citizen of the United States, residing at Philadelphia, in the county of Philadelphia and State of Pennsylvania, have invented certain new and useful Improvements in Valves, of which the following is a specification.

My invention relates to improvements in valves and particularly relates to valves for use in connection with cylinders containing gas or liquid, under pressure, for controlling the outlet of the contents of the cylinders.

The object of my invention is to provide a valve having the outlet aperture in axial alinement with the pipe line from the valve; a further object of my invention is to provide a valve stem which is movable longitudinally in the housing, preferably by means of a screw-thread, so that the rotation of the valve stem will open or close the valve, according to the direction the stem is rotated; a still further object of my invention is to provide a sealing member between the valve stem and a valve seat in the valve housing to form two separate valve seats and which sealing member is free to move when the valve stem is retracted or moved outwardly; a still further object of my invention is to provide means for engaging the sealing member and for holding it so that it will not close the valve when the valve stem is in the retracted position, and a still further object of my invention is to so construct the valve that it can be manufactured at a low cost and with great speed of production, as the parts are of simple formation, particularly the housing. Said parts can be made from stock materials, thus eliminating the necessity of providing castings.

In the accompanying drawing, Figure 1, is a vertical section of my improved valve, showing the valves closed; Fig. 2, is a view similar to Fig. 1, showing the valve open; Fig. 3, is a transverse section on line 3—3 Fig. 1; Fig. 4 is a transverse section on line 4—4 Fig. 2, and Fig. 5, is a perspective view of the stripper ring detached and looking toward the under side of the ring.

Referring to the drawings in which like reference characters refer to like parts, 1 represents the body or housing of the valve, and said housing is provided at one end thereof with a screw-threaded portion 2 by which the valve may be secured in a container 3. The housing 1 is provided with a central aperture 4 leading from the end of the housing which enters the container to a central chamber 5 formed in the housing. A valve seat 7 is provided in the housing at the inner end of the inlet aperture 4.

A valve stem 8 is mounted in the central chamber 5 of the housing 1 and said valve stem 8 is provided with an outlet aperture 10 formed longitudinally through said stem 8. The valve stem 8 is movable longitudinally in the housing 1 and is adapted to open and close the passageway through the housing. The valve stem 8 is preferably provided with a screw-thread 12 which engages a screw-thread 13 formed in the housing 1, so that by rotating the valve stem 8 the inner end of the latter will be moved toward or away from the valve seat 7, for the purpose of opening and closing the valve.

A sealing member 15 is provided between the valve seat 7 and the inner end of the valve stem 8, for the purpose of making a perfectly tight joint or closure. I prefer to use a ball 15 as the sealing member, which ball is free to move in the smaller part of the valve chamber 5, when the valve stem 8 is moved outwardly, as shown in Fig. 2. To prevent the said sealing member from following the valve stem and closing the aperture 10 formed in the latter, when the valve is in the open position, I provide a stripper ring 16, which is held in a fixed position in the housing 1. Said ring 16 will hold the sealing member 15 and allow the valve stem 8 to be withdrawn sufficiently to open the aperture formed through the valve stem.

The stripper ring 16 is provided with a central opening through which the reduced end 9 of the valve stem 8 may freely pass and engage the sealing member 15. The reduced end portion 9 of the valve stem 8 is also provided with a valve seat 14 adapted to impinge against the sealing member 15. Thus two valve seats are provided between which the sealing member is tightly impinged when the valve stem is in the position to close the valve.

The said stripper ring 16 is also provided with recesses or notches 17 which form passageways for the escape of gas or liquid through the stripper ring when the pressure in the container 3 forces the sealing member 15 against the stripper ring 16, as shown in Fig. 2. The periphery of the stripper ring 16 is provided with a screw-thread for holding it in place in the screw-threaded portion of the central chamber formed in the housing. Wrench holes 18 are shown formed in the stripper ring, in Fig. 4, by which a wrench may be used for securing said ring in place.

A packing ring 20 and a packing gland nut 21 are provided to make a tight joint between the valve stem 8 and the housing 1.

The valve stem 8 may be provided with a squared portion 22 to receive a wrench or handle for rotating the valve stem. The outer end of the valve stem 8 is provided with a screw-threaded portion 23 to facilitate in making the necessary pipe line connections or to receive a protecting cap 25, as shown in Fig. 1, to prevent the screw-threaded portion of the stem from being damaged in transportation.

By constructing the valve as above described, the necessity of providing an outlet orifice in the side of the body or housing, at right angles to the valve stem, is avoided.

Having thus described my invention I claim and desire to secure by Letters Patent:

1. A valve comprising a housing having a chamber formed therein, a sealing member mounted in the said chamber in the housing for controlling the passage therethrough, a valve stem movably mounted in said housing adapted to control the sealing member, a stripper ring secured in a fixed position in the housing for separating the sealing member from the valve stem when the latter is withdrawn, and said stripper ring having means formed thereon to form a passageway between the sealing member and the stripper ring when the sealing member is against the stripper ring.

2. A valve comprising a housing having a chamber formed therein, a valve stem movably mounted in the housing, said valve stem and said housing having passageways formed through the same in axial alinement, a spherical sealing member loosely mounted in the said chamber of the housing for controlling the passage therethrough, and means for holding the sealing member away from the valve stem when the sealing member is in the open position.

3. A valve comprising a housing having a central chamber formed therein, a valve seat formed in the housing, a valve stem movably mounted in the housing and having an opening therethrough, a valve seat formed upon the inner end of the valve stem, a sealing member adapted to be engaged between the valve seat of the housing and said valve seat of the valve stem, and means for holding the sealing member from closing the opening in the valve stem when the sealing member is in open position relative to the valve seat in the housing.

In testimony whereof I affix my signature in the presence of two witnesses.

JOSEPH A. STEINMETZ.

Witnesses:
FRANK A. CHALMERS,
G. L. SCHEHRER.